United States Patent
Forouzesh et al.

(10) Patent No.: US 11,451,139 B2
(45) Date of Patent: Sep. 20, 2022

(54) THREE-PHASE SINGLE-STAGE SOFT-SWITCHING AC-DC CONVERTER WITH POWER FACTOR CORRECTION

(71) Applicants: Queen's University at Kingston, Kingston (CA); Ganpower International Inc., Vancouver (CA)

(72) Inventors: Mojtaba Forouzesh, Kingston (CA); Xiang Zhou, Xi'an (CN); Yan-Fei Liu, Kingston (CA)

(73) Assignees: Queen's University at Kingston, Kingston (CA); Ganpower International Inc., Vancouver (CA)

( * ) Notice: Subject to any disclaimer, the term of this patent is extended or adjusted under 35 U.S.C. 154(b) by 296 days.

(21) Appl. No.: 16/744,166

(22) Filed: Jan. 15, 2020

(65) Prior Publication Data
US 2020/0235656 A1    Jul. 23, 2020

Related U.S. Application Data

(60) Provisional application No. 62/795,375, filed on Jan. 22, 2019.

(51) Int. Cl.
*H02J 7/00* (2006.01)
*H02M 1/42* (2007.01)
(Continued)

(52) U.S. Cl.
CPC ............ *H02M 1/4241* (2013.01); *H02J 7/02* (2013.01); *H02M 1/08* (2013.01); *H02M 3/01* (2021.05);
(Continued)

(58) Field of Classification Search
USPC .................. 320/106, 107, 108, 109, 110, 112
See application file for complete search history.

(56) References Cited

U.S. PATENT DOCUMENTS 10,686,385 B2   6/2020  Brown et al.
2003/0151935 A1*  8/2003  Lubomirsky ........... H02M 7/10
                                                    363/125
(Continued)

FOREIGN PATENT DOCUMENTS

CN    201830155 U   *  5/2011
CN    102447404 A   *  5/2012
(Continued)

OTHER PUBLICATIONS

Jauch, F., et al., "Combined Phase-Shift and Frequency Modulation of a Dual-Active-Bridge AC-DC Converter With PFC", IEEE Transactions on Power Electronics, vol. 31, No. 12, pp. 8387-8397, (2016).

(Continued)

*Primary Examiner* — Brian Ngo
(74) *Attorney, Agent, or Firm* — Stephen J. Scribner

(57) ABSTRACT

Three-phase single-stage AC-DC converters achieve power factor correction with low phase voltage switch stress. Direct input current sensing is performed to calculate the average input current of the AC-DC converter and implement power factor correction. Embodiments feature high power factor, single stage power conversion, and soft-switching of all switches, resulting in high conversion efficiency in a cost-effective single-stage three-phase structure. The converters have low output voltage ripple without a double line frequency component, which allows non-electrolytic capacitor implementation. The converters are particularly useful in high-power applications such as electric vehicle charging.

20 Claims, 10 Drawing Sheets

(51) Int. Cl.
  *H02M 1/08* (2006.01)
  *H02J 7/02* (2016.01)
  *H02M 3/00* (2006.01)
  *H02M 3/335* (2006.01)
  *B60L 53/00* (2019.01)
  *H02M 1/00* (2006.01)

(52) U.S. Cl.
  CPC ......... *H02M 3/33573* (2021.05); *B60L 53/00* (2019.02); *B60L 2210/30* (2013.01); *H02J 2207/20* (2020.01); *H02M 1/0009* (2021.05); *H02M 1/0058* (2021.05)

(56) References Cited

U.S. PATENT DOCUMENTS

| | | | | |
|---|---|---|---|---|
| 2007/0051712 | A1* | 3/2007 | Kooken | B23K 9/1043 219/130.1 |
| 2012/0120697 | A1* | 5/2012 | Cuk | H02M 1/4258 363/126 |
| 2015/0014290 | A1* | 1/2015 | Kooken | B23K 9/173 219/130.1 |
| 2021/0399624 | A1* | 12/2021 | Brown | H02J 7/02 |

FOREIGN PATENT DOCUMENTS

| | | | | |
|---|---|---|---|---|
| CN | 102201750 B | * | 10/2014 | |
| CN | 105305842 A | * | 2/2016 | |
| WO | WO-2018109103 A1 | * | 6/2018 | ............. B60L 53/20 |
| WO | WO-2020089739 A1 | * | 2/2020 | |

OTHER PUBLICATIONS

Kamnarn, U., et al., "Analysis and Design of a Modular Three-Phase AC-to-DC Converter Using CUK Rectifier Module With Nearly Unity Power Factor and Fast Dynamic Response". IEEE Transactions on Power Electronics, vol. 24, No. 8, pp. 2000-2012, (2009).

Zhang, J., et al., "A Dual Active Bridge DC-DC-Based Single Stage AC-DC Converter With Seamless Mode Transition and High Power Factor", IEEE Transactions on Industrial Electronics, vol. 69. No. 2, pp. 1411-1421, (2022).

* cited by examiner

THREE-PHASE SINGLE-STAGE SOFT-SWITCHING AC-DC CONVERTER WITH POWER FACTOR CORRECTION

RELATED APPLICATION

This application claims the benefit of U.S. provisional application 62/795,375 filed on Jan. 22, 2019, the contents of which are incorporated herein by reference in their entirety.

FIELD

This invention relates generally to AC-DC power converters. More specifically, the invention relates to three-phase AC-DC power converters with power factor correction and voltage regulation in a single stage. Three-phase AC-DC power converters of the invention achieve high power factor and high efficiency, and are suitable for use in high power applications.

BACKGROUND

Three-phase AC-DC converters are used in many demanding applications where high-power loads are directly connected to the utility grid. The effect of power factor in such AC-DC converters is paramount because low power factor reduces the availability of the mains electricity and high harmonics generated in the AC current produce voltage distortion leading to electromagnetic interference. Therefore, power factor correction (PFC) converters are essential to comply with the required international standards for generated current harmonics at the AC side [1]-[3].

Conventionally, PFC AC-DC converters consist of two separate single-stage converters connected in series, i.e., AC-DC rectification with PFC as the first stage and DC-DC conversion to achieve voltage regulation and in some cases voltage isolation as the second stage [4], [5]. A general structure of a two-stage three-phase AC-DC converter with PFC is show in FIG. 1. The AC-DC rectification is usually implemented with a three-phase boost converter that performs PFC and the second stage is a three-phase DC-DC converter that performs voltage regulation [6]. The main drawbacks of two-stage AC-DC converters are low conversion efficiency and low power density, both due to the use of multiple power conversion stages and large passive components, and low reliability that is due to a large number of vulnerable components, and large DC-link electrolytic capacitors that are required for DC-link voltage ripple reduction.

In new generations of AC-DC converters, single-stage structures have been proposed for both single-phase and three-phase topologies to improve reliability, integration, power density, and efficiency [7]-[12]. In single-stage three-phase converters, a three-phase diode rectifier bridge is typically used with a DC-DC converter for PFC and voltage regulation purposes. With such an approach, the whole output power is processed in one portion and hence large passive components (i.e., inductors, transformers, and capacitors) are required, which reduce the power density and efficiency. Another approach to achieve three-phase structure is a modular three-phase structure connected to a three-wire or four-wire three-phase system. Isolated three-phase single-stage modular PFC converters based on forward, flyback, SEPIC, Cuk, and push-pull converters are reported in [13]-[18]. In general, these approaches are not suitable for high power applications, and four-wire three-phase systems are not desirable because of the higher cost of implementation.

SUMMARY

According to one aspect of the invention there is provided a three-phase AC-DC converter, comprising: first, second, and third input terminals that respectively receive first, second, and third AC voltage phases of a three-wire three-phase AC input voltage; first, second, and third rectifier circuits that respectively rectify the first, second, and third AC voltage phases received by the first, second, and third input terminals, and respectively produce first, second, and third input DC voltages; first, second, and third single-stage power factor correction (PFC) modules that respectively receive the first, second, and third input DC voltages and respectively produce first, second, and third output DC voltages; and first and second output terminals; wherein the first, second, and third output DC voltages are connected together in parallel across the first and second output terminals; wherein the first, second, and third single-stage PFC modules provide simultaneous PFC operation and output voltage regulation.

Embodiments may further comprise at least one non-electrolytic output capacitor connected in parallel with the first and second output terminals.

Embodiments may further comprise first, second, and third input filters connected between the first, second, and third input terminals and the first, second, and third rectifier circuits.

In one embodiment, each of the first, second, and third single-stage PFC modules comprises a resonant converter. In one embodiment, each of the first, second, and third single-stage PFC modules comprises an LLC resonant converter. In one embodiment, each of the first, second, and third single-stage PFC modules comprises an LCC resonant converter. Embodiments may further comprise a controller; wherein the controller senses the first, second, and third input DC voltages and input DC current of the first, second, and third single-stage PFC modules, and uses the sensed voltages and currents to generate phase current reference signals; wherein the controller uses the phase current reference signals to generate gate driving signals for one or more switches of the first, second, and third single-stage PFC modules; wherein simultaneous PFC operation and output voltage regulation is provided by the first, second, and third single-stage PFC modules.

In one embodiment, each of the first, second, and third single-stage PFC modules comprises an isolated PWM boost converter. One embodiment further comprises a controller; wherein the controller senses the first, second, and third input DC voltages and input DC current of the first, second, and third single-stage PFC modules, and uses the sensed voltages and currents to adjust a duty cycle of each phase; wherein the controller generates gate driving signals for one or more switches of the first, second, and third single-stage PFC modules; wherein simultaneous PFC operation and output voltage regulation is provided by the first, second, and third single-stage PFC modules.

A three-phase AC-DC converter according to embodiments described herein may be implemented in high power AC-DC applications. In one embodiment, the high power AC-DC application comprises an electric vehicle charger.

According to another aspect of the invention there is provided a method for implementing a three-phase AC-DC converter, comprising: using first, second, and third rectifier circuits to respectively rectify first, second, and third AC voltage phases of a three-wire three-phase AC input voltage, and respectively produce first, second, and third input DC voltages; using first, second, and third single-stage power factor correction (PFC) modules that respectively receive the first, second, and third input DC voltages and respectively produce first, second, and third output DC voltages; and connecting the first, second, and third output DC voltages together in parallel to produce a final output voltage; wherein the first, second, and third single-stage PFC modules provide simultaneous PFC operation and output voltage regulation.

In one embodiment of the method, each of the first, second, and third single-stage PFC modules comprises a resonant converter. In various embodiments each of the first, second, and third single-stage PFC modules may comprise an LLC resonant converter, or an LCC resonant converter.

The method may comprise controlling the three-phase AC-DC converter by: sensing the first, second, and third input DC voltages and input DC current of the first, second, and third single-stage PFC modules, and using the sensed voltages and currents to generate phase current reference signals; and using the phase current reference signals to generate gate driving signals for one or more switches of the first, second, and third single-stage PFC modules; wherein simultaneous PFC operation and output voltage regulation is provided by the first, second, and third single-stage PFC modules.

In one embodiment of the method, each of the first, second, and third single-stage PFC modules comprises an isolated PWM boost converter.

The method may comprise controlling the three-phase AC-DC converter by: sensing the first, second, and third input DC voltages and input DC current of the first, second, and third single-stage PFC modules, and using the sensed voltages and currents to adjust a duty cycle of each phase; and generating gate driving signals for one or more switches of the first, second, and third single-stage PFC modules; wherein simultaneous PFC operation and output voltage regulation is provided by the first, second, and third single-stage PFC modules.

In various embodiments the method may further comprise an implementation in a high power AC-DC application. In one embodiment, the high power AC-DC application comprises an electric vehicle charger.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

Described herein are three-phase single-stage AC-DC converter topologies. Embodiments are based on a modular design wherein a single-stage PFC converter is used for each of the three phases, and the three single-stage PFC converters are connected in parallel to provide the DC output to the load. The single-stage PFC converter may be based on a resonant converter such as an LLC or LCC converter, or a pulse width modulation (PWM) converter such as an isolated PWM boost converter. Each single-stage PFC module may include switches in a bridge or other suitable configuration implemented for power factor correction, a converter circuit, and an output circuit. Power factor correction is achieved with phase voltage stress on the bridge switches. An input rectifier is used to provide a DC voltage for the single-stage PFC module. The input current and voltage of each single-stage PFC module are sensed to implement the power factor correction. Embodiments are capable of high power factor (e.g., above 0.99), single-stage power conversion, and soft-switching of all the switches, which provides a high power conversion efficiency (e.g., above 97%) in a cost-effective single-stage three-phase structure. Moreover, the embodiments benefit from low output voltage ripple with no double line frequency component, or substantially no double line frequency component, which allows for implementation without electrolytic capacitors, which improves reliability. Embodiments may include features of single-stage topology with reduced component count, three-wire three-phase connection that provide phase voltage to the bridge switches, no electrolytic capacitors, zero voltage switching (ZVS) turn-on of all switches and zero current switching (ZCS) turn-off of all diodes. Hence, a reliable high power density three-phase AC-DC converter with high conversion efficiency, low cost, and compact size may be achieved with the embodiments.

Embodiments may be used in any application, and are particularly suitable for high power applications. An example of a high power application is an electric vehicle DC fast charging station, where high power delivery is required.

As noted above, a common prior approach to modular three-phase converters is based on four-wire three-phase systems to apply phase voltage to each module. When a three-wire system is used for these converters, line-to-line voltage is applied to each module, such that high voltage rating switches are required in the circuits, which makes them expensive to implement. In contrast, embodiments described herein are optimized for three-wire three-phase systems and may be designed to take advantage of suitable high-voltage switching devices, such as, for example, 650 V gallium nitride (GaN) high electron mobility transistors (HEMTs), for improved performance.

Figure 1:
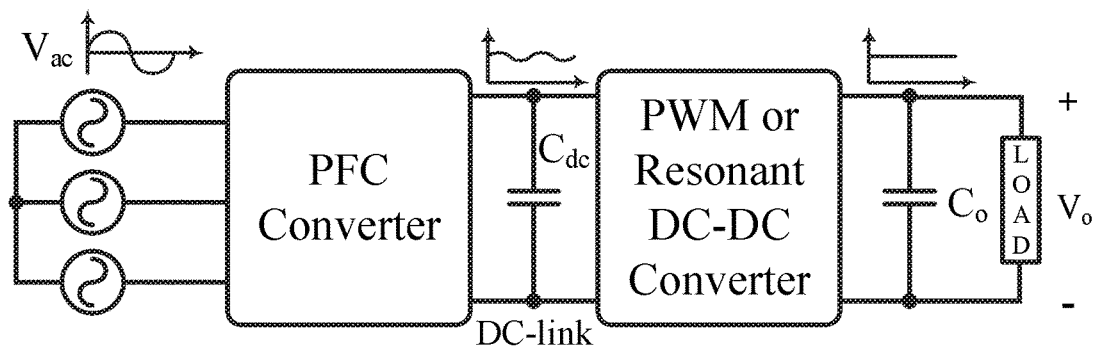
FIG. 1 is a block diagram of a two-stage three-phase AC-DC converter according to the prior art.
Figure 2A:
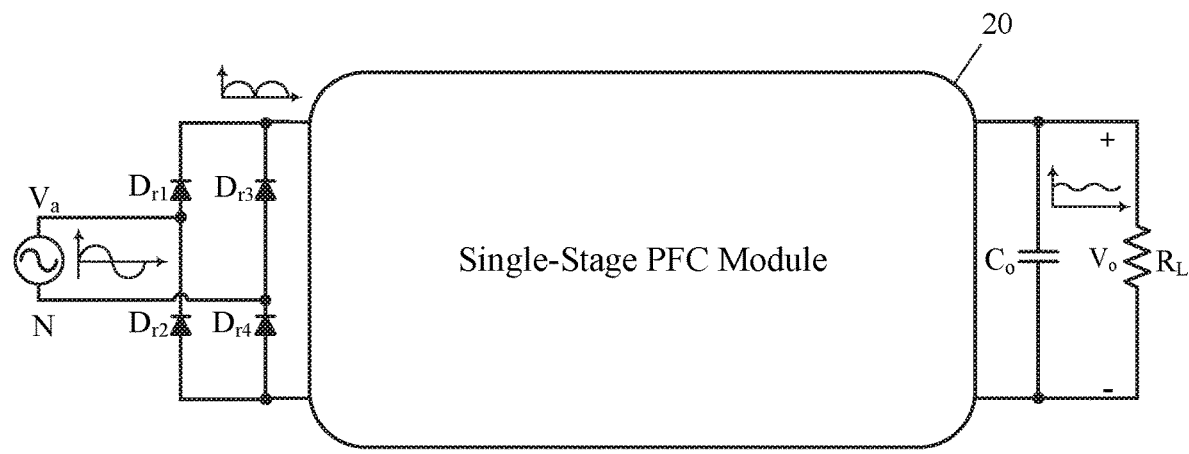
FIG. 2A is a schematic diagram of a single-phase single-stage PFC converter, according to one embodiment.

FIG. 2A is a generalized circuit diagram showing a module of a single-stage PFC converter. Three such modules are used for three-phase converter embodiments, one module for each phase. The input AC voltage Va is one of three phases of a three-wire three-phase AC power supply (i.e., the mains power, typically low frequency (e.g., 50 Hz or 60 Hz). Rectifier diodes Dr1-Dr4 in a full-bridge configuration provide DC power to the single-stage PFC module 20. An output capacitor Co is connected in parallel with the load, shown as $R_L$. The output voltage is a DC voltage with a double line frequency component. As noted above, the single-stage PFC module may be implemented with a resonant converter or a pulse width modulation (PWM) converter.

Figure 2B:
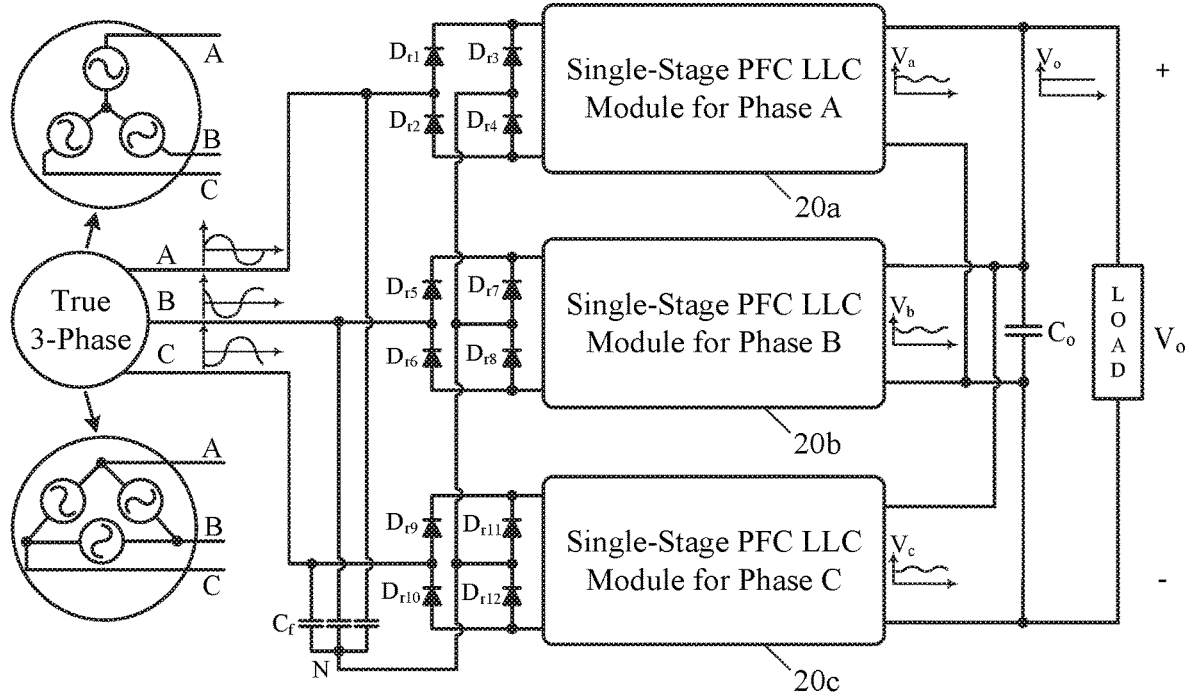
FIG. 2B is a schematic diagram of a three-wire three-phase PFC converter according to one embodiment wherein each phase is implemented with a single-stage PFC module.

FIG. 2B is a generalized circuit diagram showing a three-phase single-stage PFC converter according to embodiments described herein. Each of the three modules 20a, 20b, 20c, together with the rectifier circuits, is identical. The input AC voltage to the rectifier for each module is one of the three phases A, B, C of a three-wire three-phase AC power supply (i.e., the mains power). As shown in FIG. 2B, the three-wire three-phase AC power supply may have, e.g., a star or delta connection, and may be referred to herein as a "true" three-phase power supply. Capacitors $C_f$ connected between each of the three AC phases, are used to create a neutral point that is connected to the common point of the three rectifier circuits. In this way, each rectifier receives only the phase voltage and not the line voltage. The outputs of the three modules are connected together in parallel across an output capacitor Co, which is connected in parallel with the load. The output from each single-stage module is a DC voltage with a double line frequency component. When the three DC outputs are connected together in parallel the double line frequency components are completely or substantially cancelled, avoiding the need for a large electrolytic output capacitor, and resulting in a completely or substantially ripple-free DC output voltage at the load using only a small output capacitor.

Figure 3A:
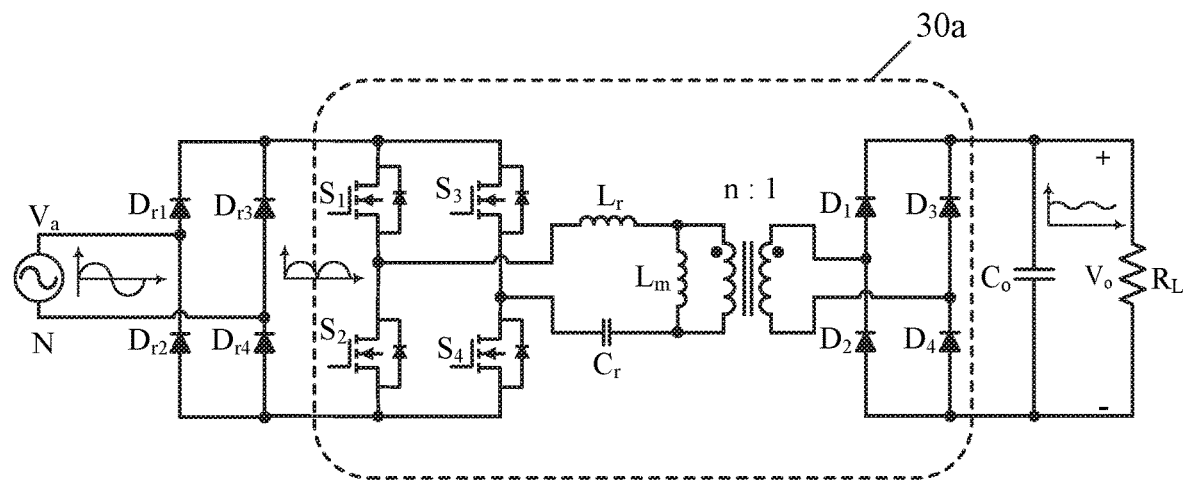
FIGS. 3A-3C are schematic diagrams of single-stage PFC modules based on an LLC resonant converter, an LCC resonant converter, and an isolated PWM boost converter, respectively, according to various embodiments.
Figure 3B:
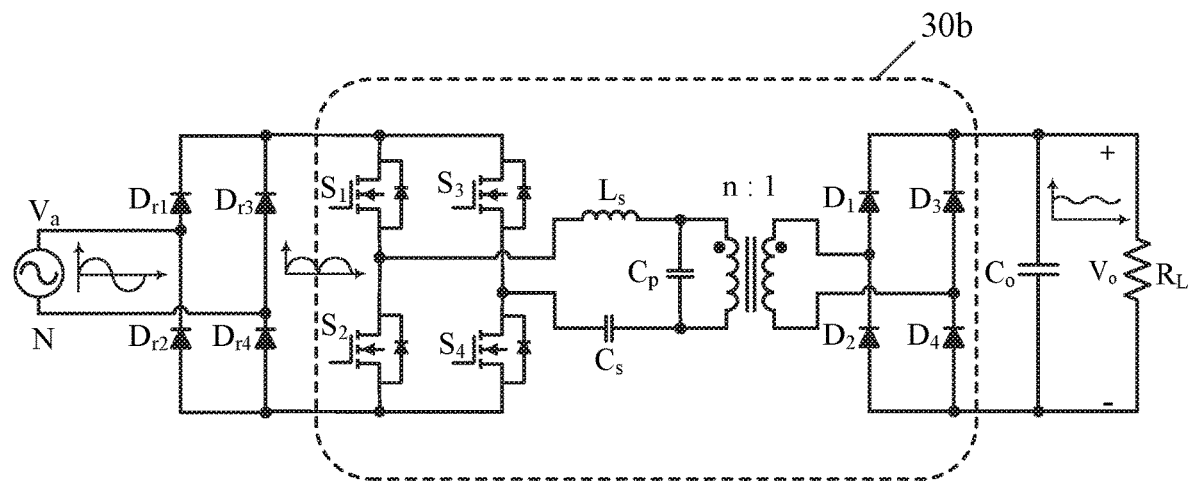
Figure 3C:
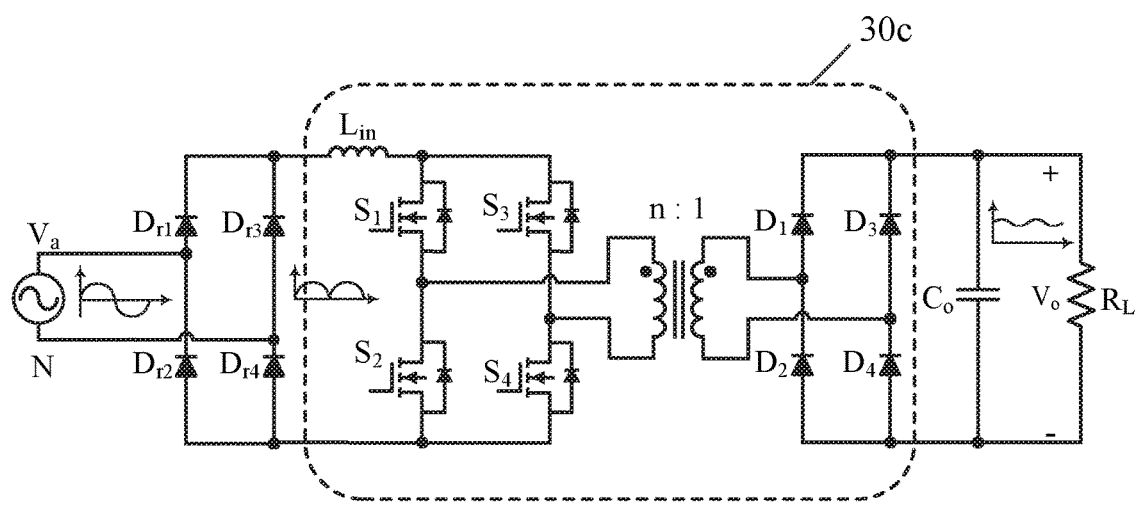

As noted above, a single-stage PFC module may be implemented with various converter designs. These may include frequency controlled converter modules or pulse width modulated converter modules. For example, FIGS. 3A and 3B are circuit diagrams showing embodiments of a single-stage PFC module 30a, 30b implemented with a LLC converter and a LCC resonant converter, respectively, and FIG. 3C is a circuit diagram showing an embodiment of a single-stage PFC module 30c implemented with an isolated PWM boost converter. In all embodiments the rectified AC voltage feeds the primary side of a full bridge of the converter and the output voltage is a DC voltage with a small ripple at double the line frequency. The PFC operation of the LCC resonant converter is similar to that of the LLC converter, which may be realized by changing the switching frequency between the series resonant and parallel resonant frequencies. For the isolated PWM boost converter, PFC operation may be realized by changing the duty cycle of the main switch ($S_1$) between the minimum duty cycle and the maximum duty cycle. The embodiments apply only a low voltage stress to the primary side switch(es), and high efficiency and high power density may be achieved due to the modular structure and the requirement for only a small (non-electrolytic) output capacitance.

Figure 4A:
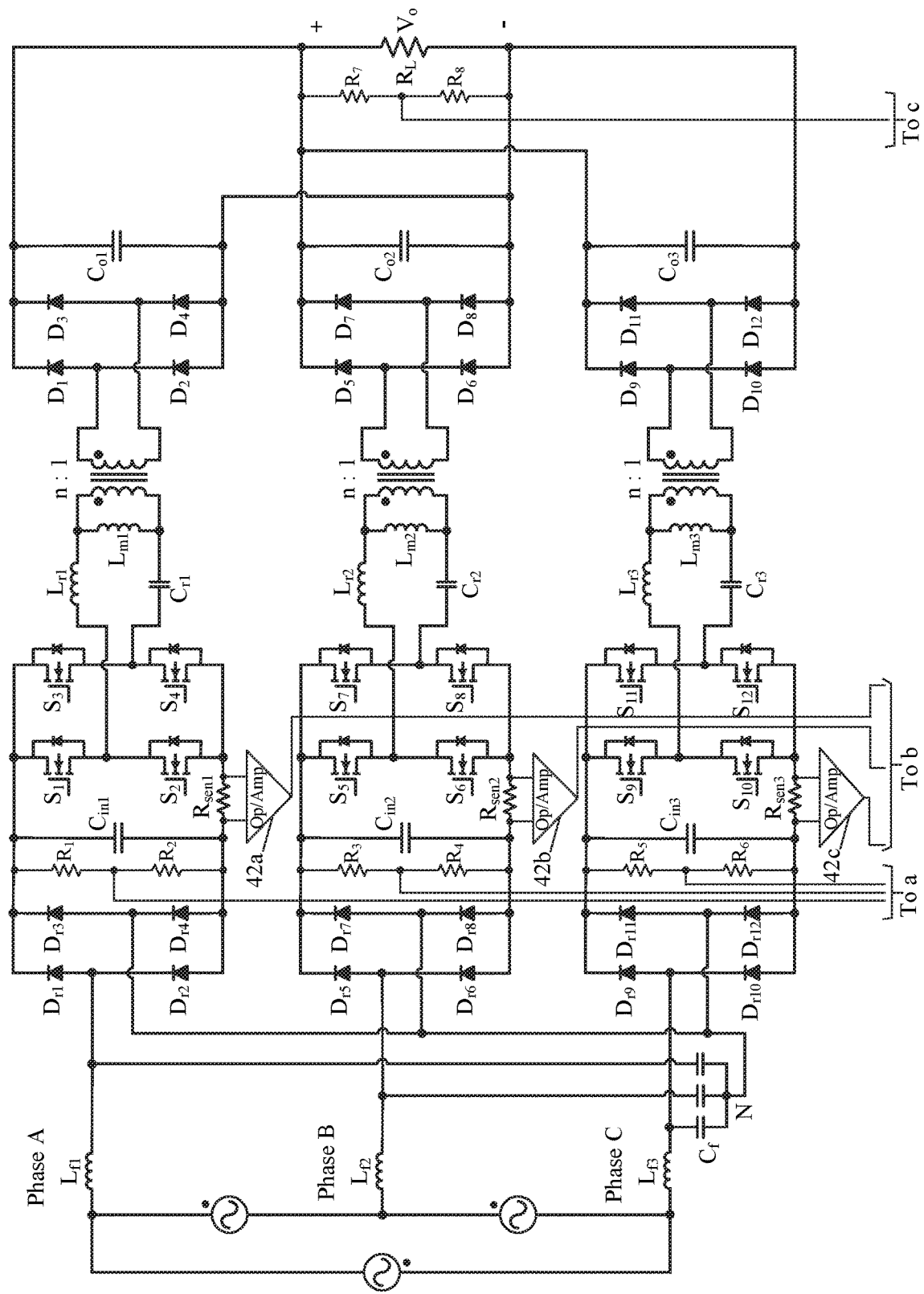
FIGS. 4A-4B are schematic diagrams of a three-phase single-stage PFC LLC converter with a digital control implementation, according to one embodiment.
Figure 4B:
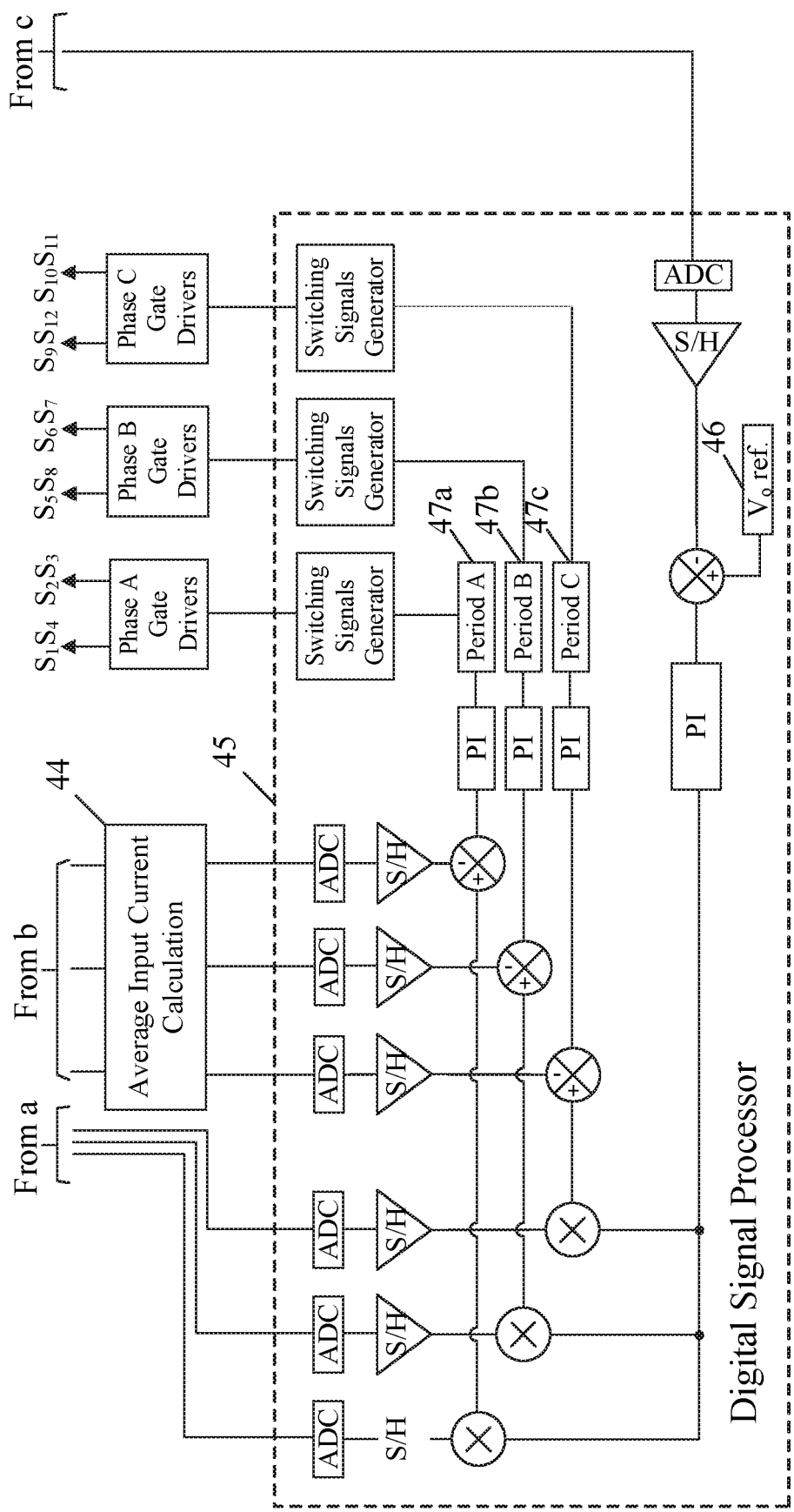
Figure 5A:
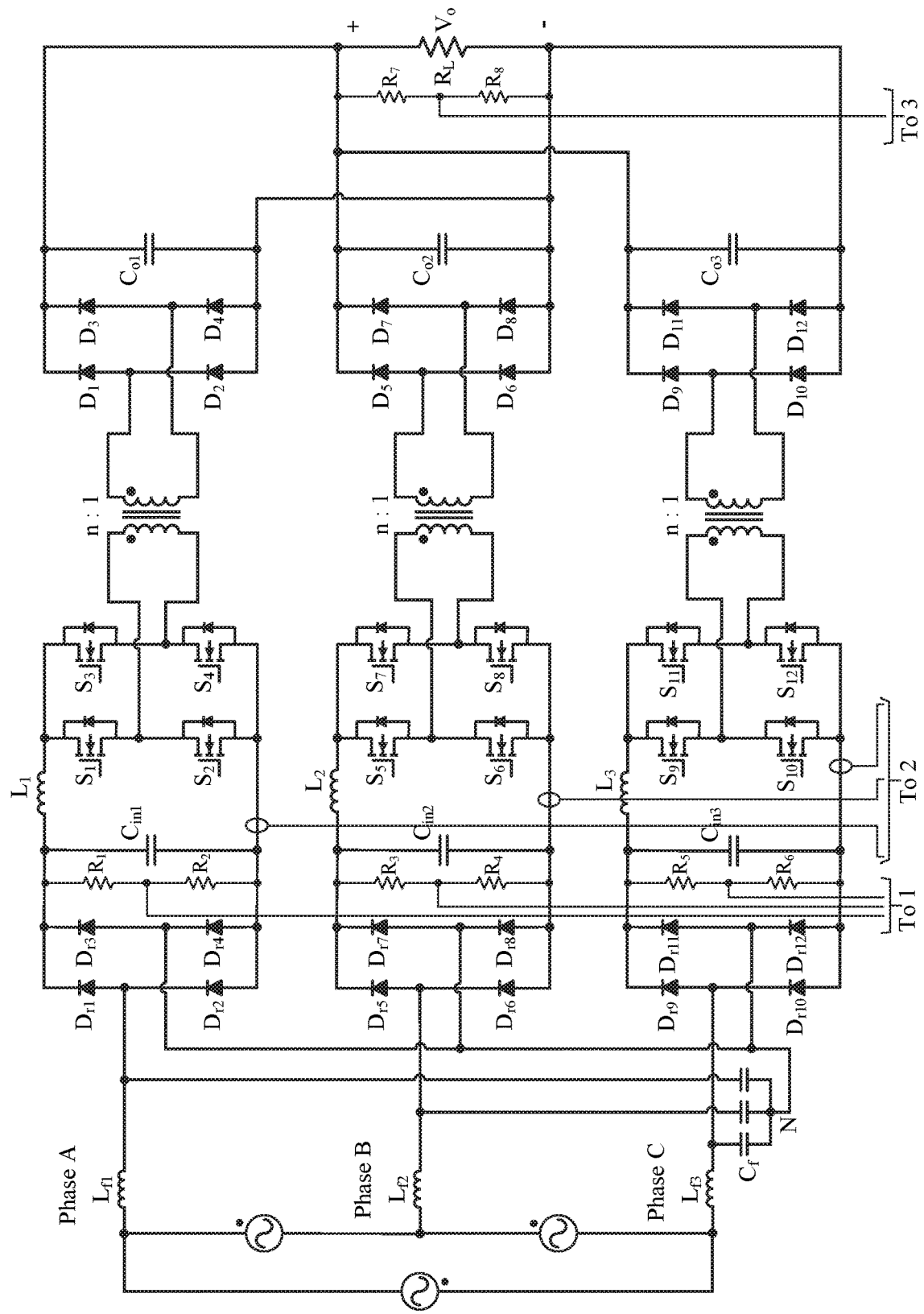
FIGS. 5A-5B are schematic diagrams of a three-phase single-stage PFC isolated PWM boost converter with a digital control implementation, according to one embodiment.
Figure 5B:
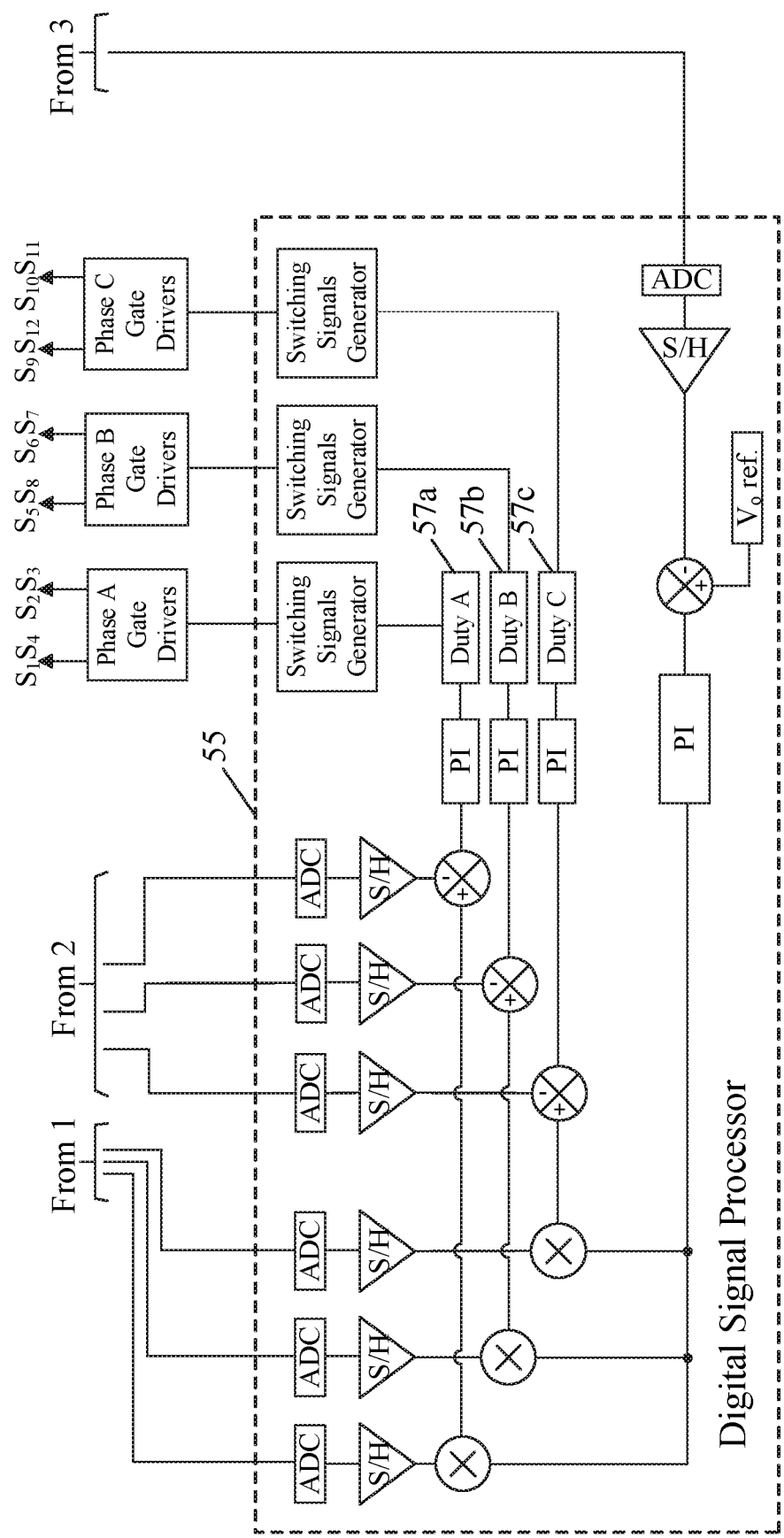

FIGS. 4A-4B and 5A-5B show embodiments of three-phase single-stage PFC converters implemented with LLC and isolated PWM boost PFC modules, respectively, together with digital controllers. Connections between the portions shown in FIGS. 4A and 4B are indicated by "To/From a", "To/From b", and "To/From c". Connections between the portions shown in FIGS. 5A and 5B are indicated by "To/From 1", "To/From 2, and "To/From 3".

Referring to the embodiment of FIGS. 4A-4B, control of a three-phase single-stage LLC PFC AC-DC converter may include input voltage sensing circuits $R_1$-$R_2$, $R_3$-$R_4$, and $R_5$-$R_6$, input current sensing circuits, $Rsen_1$, $Rsen_2$, and $Rsen_3$ together with respective operational amplifiers 42a, 42b, and 42c, and output voltage sensing resistors R7-R8. An average current calculator 44 receives the outputs of the operational amplifiers 42a, 42b, and 42c, and the average input current is calculated and used for power factor correction. In the digital control block 45 signals from input and output voltage sensing circuits and the average current calculator 44 are digitized using analog-to-digital converters (ADC), sampled (sample & hold, S/H). The sampled output voltage is compared with a reference voltage 46 and used for comparisons with the input voltage and current signals. Outputs of the comparators are processed using PI compensators and multipliers to generate phase current reference signals at 47a, 47b, 47c, and gate driving signals are generated for the switches of the PFC modules of each phase. Hence, there is one voltage control loop to realize output voltage regulation and each phase has its own current control loop to realize PFC individually. Control of a three-phase single-stage PFC converter with LCC PFC modules may be implemented similarly to that for the LLC modules.

Referring to the embodiment of FIGS. 5A-5B, control of a three-phase single-stage isolated PWM boost PFC AC-DC converter may be implemented similarly to that described above. In the digital control block 55 (FIG. 5B), processing of the sampled/compared signals following PI compensation includes adjusting the duty cycle of each phase at blocks 57a, 57b, 57c, with subsequent generation of the gate driving signals for the switches of the PFC modules of each phase. As in the above case for LLC (LCC) PFC modules, there is one voltage control loop to realize output voltage regulation and each phase has its own current control loop to realize PFC individually.

Further description will now be provided for a single-stage LLC PFC module, as a non-limiting example.

Design Considerations for a Three-Phase Single-Stage LLC PFC Converter

The following equations are used for an LLC tank circuit.

$$f_r = \frac{1}{2\pi\sqrt{L_r C_r}} \tag{1}$$

$$f_p = \frac{1}{2\pi\sqrt{(L_r + L_m)C_r}} \tag{2}$$

$$Q = \frac{\pi^2}{8n^2} \times \sqrt{\frac{L_r}{C_r}} \times \frac{1}{R_L} \tag{3}$$

$$G_{LLC(total)} = \frac{1}{n} \times \frac{1}{\sqrt{\left[1 + \frac{1}{K}\left(1 - \frac{1}{f_n^2}\right)\right]^2 + \left[\left(f_n - \frac{1}{f_n}\right)Q\right]^2}} \tag{4}$$

In (3) n is the turns ratio of the transformer and is defined as $n=N_p/N_s$. In (4) K is the inductance ratio and is defined as $K=L_m/L_r$, and $f_n$ is the frequency ratio and is defined as $f_n=f_s/f_r$. In PFC operation the instantaneous output power of an LLC converter is changing based on the phase angle (θ) and hence to achieve high output power an LLC converter should achieve different gains at different input voltage levels. For a lossless circuit the instantaneous output power is calculated as follows:

$$p_{out}(\theta)=p_{in}(\theta)=v_{in}(\theta)i_{in}(\theta)=2V_{in(RMS)}I_{in(RMS)}\sin(\theta)^2=2\sin(\theta)^2 P_o \quad (5)$$

From (5), the maximum instantaneous output power occurs at θ=90° and is equal to twice the rated output power and the input voltage is equal to $1.414V_{in(RMS)}$. The instantaneous output power at θ=45° is equal to the rated output power and the input voltage is equal to $V_{in(RMS)}$. The instantaneous output power at θ=30° is equal to the rated output power and the input voltage is equal to $0.707V_{in(RMS)}$.

As three identical single-phase PFC modules are employed in a three-phase converter, only design guidelines for one PFC module will be discussed. The first step of the design procedure is to find the transformer turns ratio (n) based on the input and out voltages of the LLC PFC converter. In PFC application the minimum voltage gain is required at θ=90° when the input voltage is at its peak value ($\sqrt{2}V_{in}$). In order to consider line voltage fluctuations, the maximum input voltage should be considered at θ=90°. The transformer turns ratio is found such that the minimum gain of the LLC PFC is achieved in the inductive area and at or near the series resonant frequency $f_r$, where the LLC voltage gain is unity. The maximum required voltage gain in PFC application should be theoretically infinite to compensate for line voltage zero crossing regions. However, if the minimum switching frequency of an LLC PFC AC-DC converter is set at the parallel resonant frequency ($f_p$) of the LLC resonant tank, a high-power factor can be achieved.

$$G_{req}^{min}(\theta) = G_{req}\left(\frac{\pi}{2}\right) = \frac{V_o}{\sqrt{2}\,V_{in(RMS)}\sin\left(\frac{\pi}{2}\right)} = \frac{V_o}{\sqrt{2}\,V_{in(RMS)}} \quad (5)$$

$$G_{LLC(total)} = \frac{2}{n} \times G_{LLC} \rightarrow G_{LLC(total)}^{min} = \frac{2}{n} \quad (6)$$

$$n = \frac{N_p}{N_s} = \frac{\sqrt{2}\,V_{in(RMS)}^{max}}{V_o} \quad (7)$$

When the turns ratio is calculated from (7) the total required gain at the parallel resonant frequency and θ=90° for the LLC tank should be higher than input voltage fluctuations as follows:

$$G_{LLC(total)} > \frac{V_{in(RMS)}^{max}}{V_{in(RMS)}^{min}} \quad (7)$$

The converter is connected to a three-wire three-phase system with 20% fluctuations and it regulates the output voltage to a constant value. Although a constant output voltage is considered for simulations, wide output voltage variations also can be incorporated into the design. Considering 400V output voltage, the transformers turns ratio can be calculated from (3) as $n=\times\sqrt{2}\times220*1.2/400\cong0.93$. The maximum switching frequency is set to about 250 kHz and the minimum switching frequency can be calculated from (2) as $f_p$=139.6 kHz. For PFC operation, the minimum switching frequency is set to about $f_p$ to ensure operation in the inductive area and the maximum switching frequency is set slightly high than $f_r$ to ensure output voltage regulation at maximum voltage gain requirement.

EXAMPLE

Figure 6:
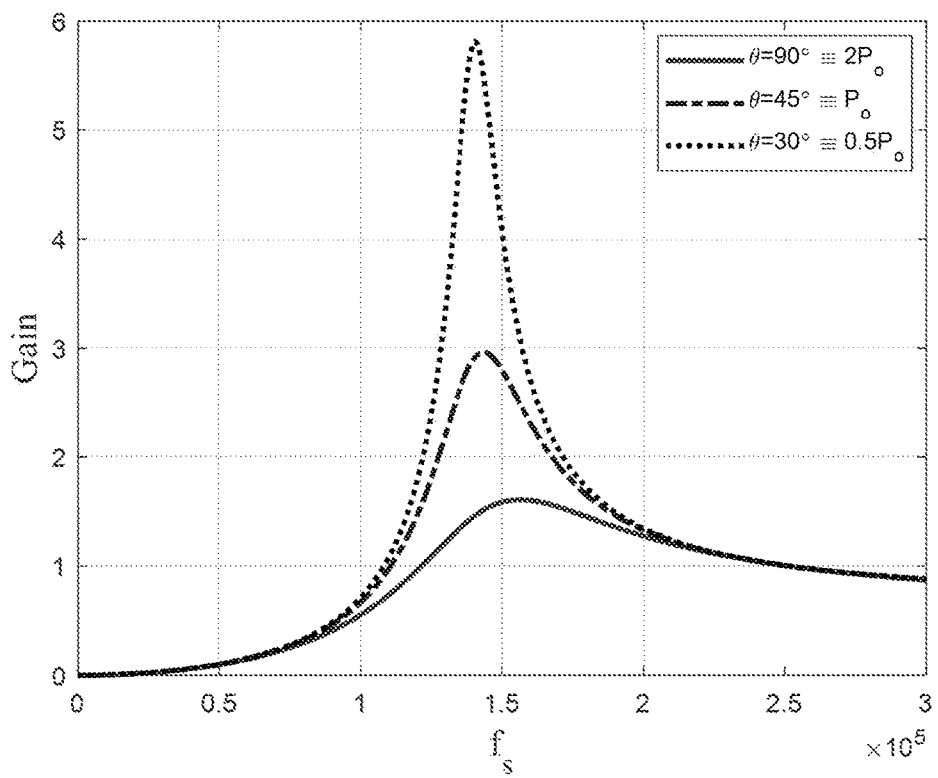
FIG. 6 is a plot showing voltage gain of an LLC tank circuit at different phase angles.

A three-phase single-stage LLC PFC AC-DC converter was simulated using PSIM™ software (Powersim, Rockville, Md., USA). FIGS. 4A-4B show the schematic diagram of the three-phase single-stage LLC PFC AC-DC converter with its sensing circuits and digital control implementation. Table I shows the set of parameters used for the simulations. The voltage gain requirement for an LLC tank with different phase angles or output powers is plotted in FIG. 6 using the parameters of Table I.

TABLE I

Parameters used in the simulation.

| Parameters | Values/Description |
|---|---|
| Output Power ($P_o$) | 3 kW |
| Input Voltage ($V_{g1}$, $V_{g2}$, $V_{g3}$) | 220 Vac |
| Output Voltage ($V_o$) | 400 Vdc |
| Switching Frequency ($f_s$) | 140 kHz-280 kHz |
| Parallel Resonant Inductor ($L_m$) | 45 μH |
| Series Resonant Inductor ($L_r$) | 20 μH |
| Series Resonant Capacitor ($C_r$) | 20 nF |
| Transformer Turns Ratio ($N_p$:$N_s$) | 15:16 |
| Input Filter      Inductor ($L_f$) | 100 μH |
|               Capacitor ($C_f$) | 1 μF |
| Input Capacitor ($C_{in}$) | 20 nF |
| Output Capacitor ($C_{o1}$, $C_{o2}$, $C_{o3}$) | 100 μF |
| Input rectifier ($D_{r1}$-$D_{r12}$) | IDW30E65D1, 650 V 30 A (Infineon Technologies AG) |
| Switches ($S_1$-$S_{12}$) | GPI65015TO, N-channel 650 V 15 A GaN power HEMT (GaNPower International Inc.) |
| Output rectifier ($D_1$-$D_{12}$) | STPSC10065GY, 650 V power Schottky silicon carbide diode (ST Microelectronics) |

It is noted that MOSFETs could be substituted for the input rectifier diodes (e.g., IPW65R045C7 650 V C7 power transistor (Infineon Technologies AG)) and for the output rectifier diodes (e.g., IPT60R050G7 600 V G7 power transistor (Infineon Technologies AG)).

Figure 7:
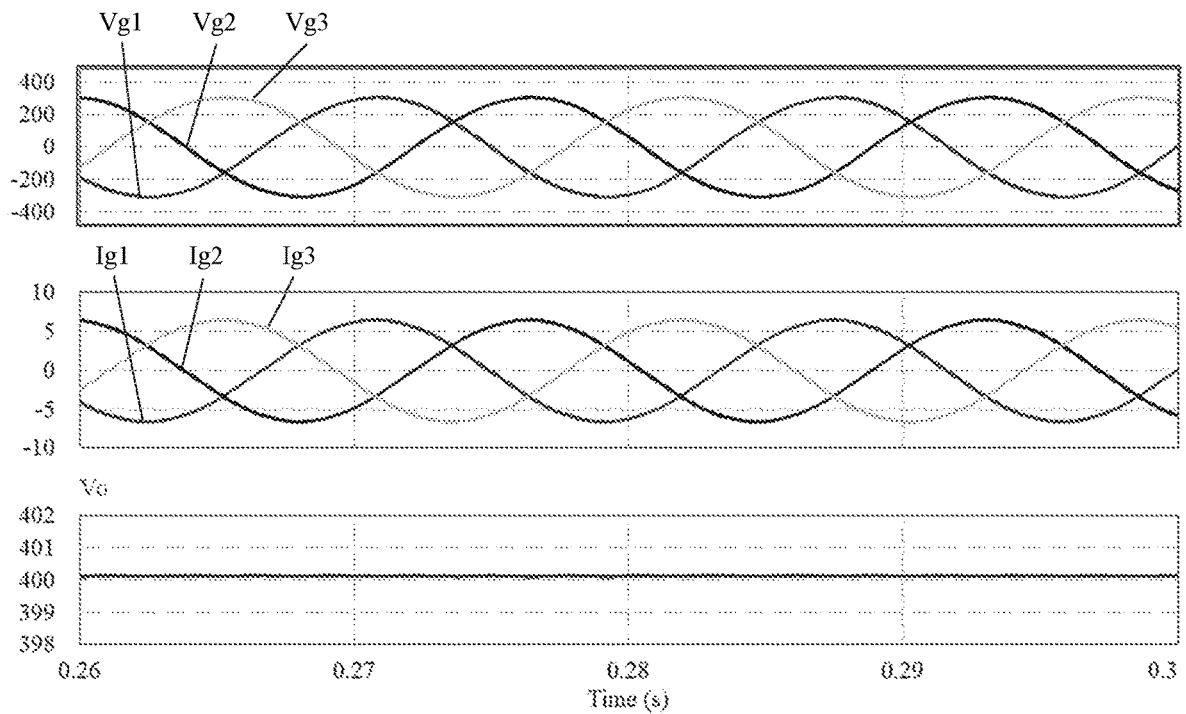
FIG. 7 is a plot showing simulation results of a three-phase single-stage resonant PFC LLC converter according to the embodiment of FIGS. 4A-4B, with 380 VAC RMS three-phase input voltage (upper panel), three-phase input current (middle panel), and 400 VDC output voltage (lower panel) under full load.

FIG. 7 shows the simulation results for input voltages and currents for all three phases at 380 VAC RMS three-phase input voltage and 400 VDC output voltage at full load. The measured power factor was close to unity (>0.999) and all three phases exhibited good performance. Moreover, the output voltage of the three-phase single-stage PFC converter had substantially no double line frequency ripple and the peak-to-peak voltage ripple was about 0.04 V (~0.01%).

Figure 8:
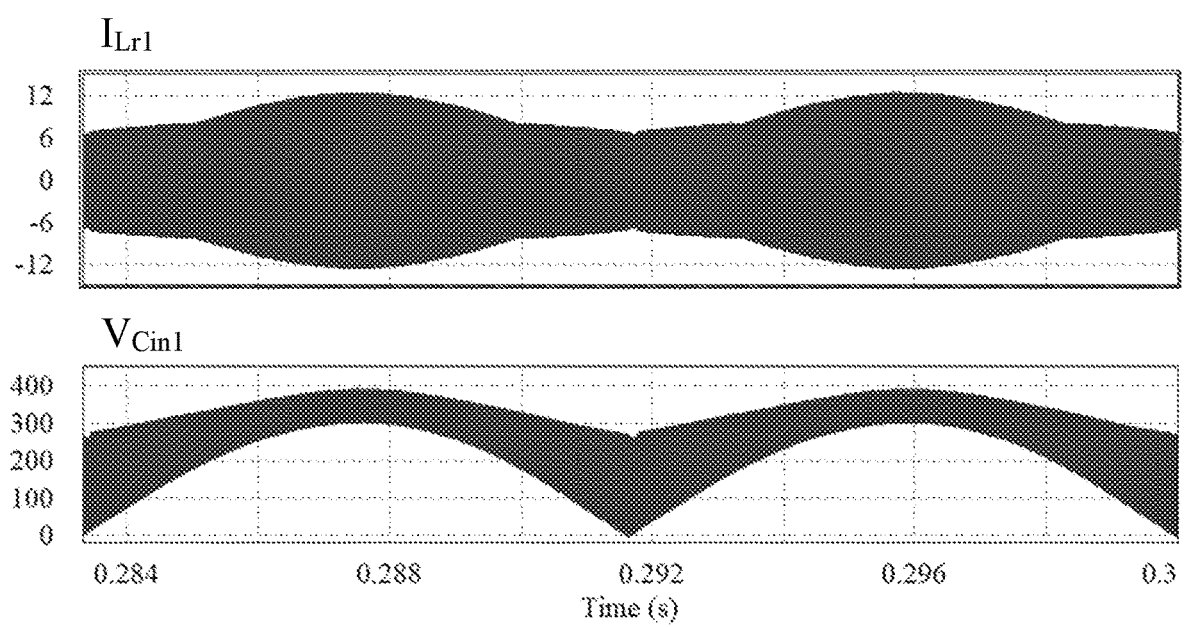
FIG. 8 is a plot showing simulation results for resonant current (upper panel) and input voltage (lower panel) of the first phase of the embodiment of FIGS. 4A-4B, with 380 VAC RMS three-phase input voltage and 400 VDC output voltage under full load.

FIG. 8 shows the resonant current and input voltage of the first phase for one line cycle at 380 VAC RMS three-phase input voltage and 400 VDC output voltage at full load. It is clear that the peak input voltage is below 400 V, hence 650 V GaN HEMTs can be used to improve high frequency switching performance and to reduce the volume of the converter. Moreover, the peak of the resonant current occurs in peak of input voltage (θ=90°).

Figure 9A:
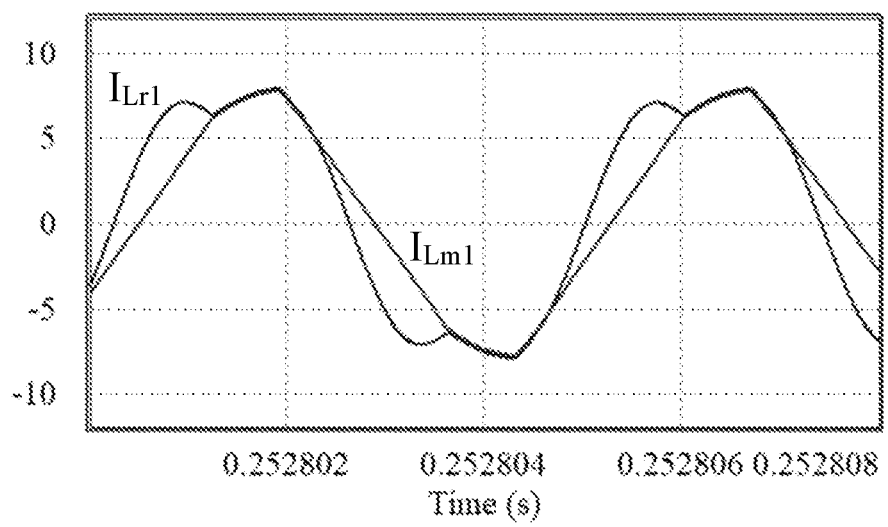
FIGS. 9A-9C are plots showing simulation results for resonant current and parallel inductor current of the first phase of the embodiment of FIGS. 4A-4B, with 380×1.2 VAC RMS three-phase voltage, for input voltage phase angles of (A) θ=30°, (B) θ=45° and (C) θ=90°.
Figure 9B:
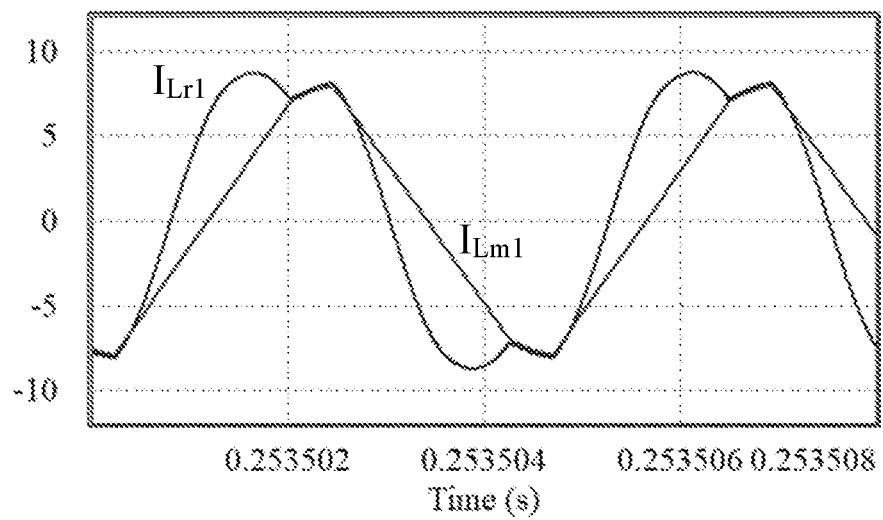
Figure 9C:
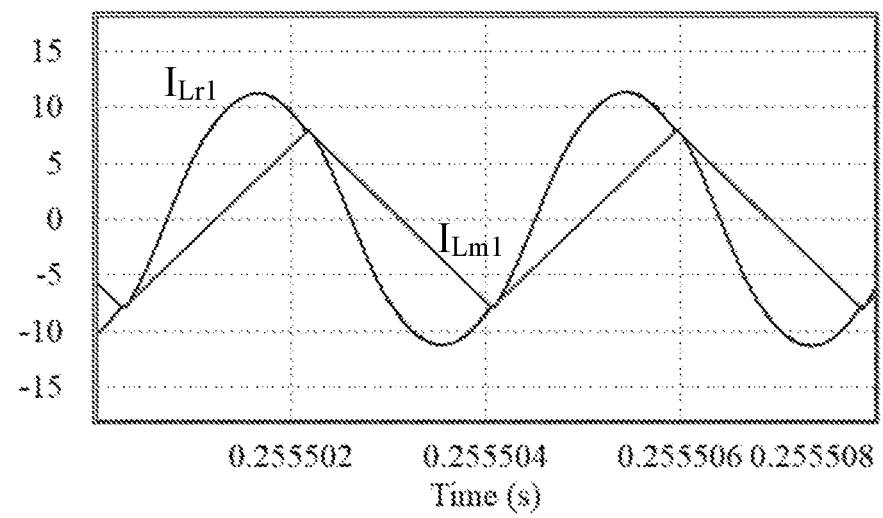

FIGS. 9A-9C show the resonant current and parallel inductor current for the first phase with different input voltage phase angles (θ=30°, θ=45°, and θ=90°, respectively), considering 380×1.2 V RMS three-phase voltage. It is clear that the operating point at θ=90° is close to the resonant frequency, confirming that ZCS is achieved for the output diodes ($D_1$-$D_{12}$).

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

REFERENCES

[1] Rossetto, L., Cr. Spiazzi, and P. Tenti. Control techniques for power factor correction converters, *PEMC*, vol. 94, pp. 1310-1318, 1994.
[2] Wanfeng Zhang, Guang Feng, Yan-Fei Liu and Bin Wu, A digital power factor correction (PFC) control strategy optimized for DSP, *IEEE Transactions on Power Electronics*, vol. 19, no. 6, pp. 1474-1485, November 2004.
[3] B. Singh, B. N. Singh, A. Chandra, K. Al-Haddad, A. Pandey and D. P. Kothari, A review of three-phase improved power quality AC-DC converters, *IEEE Transactions on Industrial Electronics*, vol. 51, no. 3, pp. 641-660, June 2004.
[4] J. Kim, M. Kim, C. Yeon and G. Moon, Analysis and design of Boost-LLC converter for high power density AC-DC adapter, 2013 *IEEE ECCE Asia Downunder*, Melbourne, VIC, 2013, pp. 6-11.
[5] Siliang Zhang, Guixing Lan, Zezheng Dong and X. Wu, A high efficiency two-stage ZVS AC/DC converter with all SiC MOSFET, 2017 *IEEE 3rd International Future Energy Electronics Conference and ECCE Asia (IFEEC 2017—ECCE Asia)*, Kaohsiung, 2017, pp. 163-169.
[6] H. Bai, et al., Design of an 11 kW power factor correction and 10 kW ZVS DC/DC converter for a high-efficiency battery charger in electric vehicles, *IET Power Electron*, vol. 5, no. 9, pp. 1714-1722, 2012.
[7] C. Lai, R. Lee, T. Wang and K. Shyu, Design and implementation of a single-stage LLC resonant converter with high power factor, 2007 *IEEE International Symposium on Industrial Electronics*, Vigo, 2007, pp. 455-460.
[8] D. C. Martins and M. M. Casaro, Isolated three-phase rectifier with high power factor using the zeta converter in continuous conduction mode, *IEEE Transactions on Circuits and Systems I: Fundamental Theory and Applications*, vol. 48, no. 1, pp. 74-80, January 2001.
[9] D. S. Wijeratne and G. Moschopoulos, A three-phase single-stage AC-DC PWM buck-type full-bridge converter: Analysis, design, and characteristics, *IEEE Transactions on Industrial Electronics*, vol. 60, no. 10, pp. 4201-4214, October 2013.
[10] Y. Liao and Z. Dai, Two-switch three-phase LLC resonant circuit with power factor correction for microscale wind power generation system, 2018 *IEEE International Conference on Industrial Electronics for Sustainable Energy Systems (IESES)*, Hamilton, 2018, pp. 382-388.
[11] E. Kim, Y. Heo, T. Marius and J. Lee, Three-phase single-stage three-level AC/DC converter with a wide output voltage control range, 2018 *IEEE Applied Power Electronics Conference and Exposition (APEC)*, San Antonio, Tex., 2018, pp. 2015-2020.
[12] Y. Jang, et al., A new, two-switch, isolated, three-phase AC-DC converter, 2018 *IEEE Applied Power Electronics Conference and Exposition (APEC)*, San Antonio, Tex., 2018, pp. 60-67.
[13] Y. K. E. Ho, S. Y. R. Hui and Yim-Shu Lee, Characterization of single-stage three-phase power-factor-correction circuit using modular single-phase PWM DC-to-DC converters, *IEEE Trans. Power Electron.*, vol. 15, no. 1, pp. 62-71, January 2000.
[14] B. Tamyurek and D. A. Torrey, A three-phase unity power factor single-stage AC-DC converter based on an interleaved flyback topology, *IEEE Transactions on Power Electronics*, vol. 26, no. 1, pp. 308-318, January 2011.
[15] X. Zhang, L. Zhou, D. Qiu, W. Xiao, B. Zhang and F. Xie, Phase-modular three-phase isolated bridgeless PFC converter, *IECON 2015—41st Annual Conference of the IEEE Industrial Electronics Society*, Yokohama, 2015, pp. 001723-001728.
[16] G. Tibola and I. Barbi, Isolated three-phase high power factor rectifier based on the SEPIC converter operating in discontinuous conduction mode, *IEEE Trans. Power Electron.*, vol. 28, no. 11, pp. 4962-4969, November 2013.
[17] U. Kamnarn and V. Chunkag, Analysis and design of a modular three-phase AC-to-DC converter using CUK rectifier module with nearly unity power factor and fast dynamic response, *IEEE Transactions on Power Electronics*, vol. 24, no. 8, pp. 2000-2012, August 2009.
[18] G. Bhuvaneswari, S. Narula and B. Singh, Three-phase push-pull modular converter based welding power supply with improved power quality, *Proc. India International Conference on Power Electronics (IICPE)*, Delhi, 2012, pp. 1-5.

What is claimed is:
1. A three-phase AC-DC converter, comprising:
first, second, and third input terminals that respectively receive first, second, and third AC voltage phases of a three-wire three-phase AC input voltage;
first, second, and third rectifier circuits that respectively rectify the first, second, and third AC voltage phases received by the first, second, and third input terminals, and respectively produce first, second, and third input DC voltages;
first, second, and third single-stage power factor correction (PFC) modules that respectively receive the first, second, and third input DC voltages and respectively produce first, second, and third output DC voltages;
first and second output terminals; and
a controller;
wherein the first, second, and third output DC voltages are connected together in parallel across the first and second output terminals;
wherein the controller senses the first, second, and third input DC voltages and input DC current of the first, second, and third single-stage PFC modules, and controls the first, second, and third single-stage PFC modules according to a single control parameter determined from the sensed voltages and currents;
wherein the first, second, and third single-stage PFC modules provide simultaneous PFC operation and output voltage regulation with soft-switching.
2. The three-phase AC-DC converter of claim 1, further comprising at least one non-electrolytic output capacitor connected in parallel with the first and second output terminals.

3. The three-phase AC-DC converter of claim 1, further comprising first, second, and third input filters connected between the first, second, and third input terminals and the first, second, and third rectifier circuits.

4. The three-phase AC-DC converter of claim 1, wherein each of the first, second, and third single-stage PFC modules comprises a resonant converter.

5. The three-phase AC-DC converter of claim 4, wherein each of the first, second, and third single-stage PFC modules comprises an LLC resonant converter.

6. The three-phase AC-DC converter of claim 4, wherein each of the first, second, and third single-stage PFC modules comprises an LCC resonant converter.

7. The three-phase AC-DC converter of claim 4, wherein the single control parameter is switching frequency and is used by the controller to generate phase current reference signals for the first, second, and third single-stage PFC modules;
wherein the controller uses the phase current reference signals to generate gate driving signals for one or more switches of the first, second, and third single-stage PFC modules;
wherein simultaneous PFC operation and output voltage regulation with soft-switching is provided by the first, second, and third single-stage PFC modules.

8. The three-phase AC-DC converter of claim 1, wherein each of the first, second, and third single-stage PFC modules comprises an isolated PWM boost converter.

9. The three-phase AC-DC converter of claim 8, wherein the single control parameter is duty cycle and is used by the controller to adjust a duty cycle of the first, second, and third single-stage PFC modules;
wherein the controller generates gate driving signals for one or more switches of the first, second, and third single-stage PFC modules;
wherein simultaneous PFC operation and output voltage regulation with soft-switching is provided by the first, second, and third single-stage PFC modules.

10. The three-phase AC-DC converter of claim 1, implemented in an electric vehicle charger.

11. An electric vehicle charger comprising the three-phase AC-DC converter of claim 1.

12. A method for implementing a three-phase AC-DC converter, comprising:
using first, second, and third rectifier circuits to respectively rectify first, second, and third AC voltage phases of a three-wire three-phase AC input voltage, and respectively produce first, second, and third input DC voltages;
using first, second, and third single-stage power factor correction (PFC) modules that respectively receive the first, second, and third input DC voltages and respectively produce first, second, and third output DC voltages;
connecting the first, second, and third output DC voltages together in parallel to produce a final output voltage;
sensing the first, second, and third input DC voltages and input DC current of the first, second, and third single-stage PFC modules, and using a controller to control the first, second, and third single-stage PFC modules according to a single control parameter determined from the sensed voltages and currents;
wherein the first, second, and third single-stage PFC modules provide simultaneous PFC operation and output voltage regulation with soft-switching.

13. The method of claim 12, comprising connecting at least one non-electrolytic output capacitor in parallel with the final output voltage.

14. The method of claim 12, wherein each of the first, second, and third single-stage PFC modules comprises a resonant converter.

15. The method of claim 14, wherein each of the first, second, and third single-stage PFC modules comprises an LLC resonant converter.

16. The method of claim 14, wherein each of the first, second, and third single-stage PFC modules comprises an LCC resonant converter.

17. The method of claim 14, wherein the single control parameter is switching frequency and is used by the controller to generate phase current reference signals for the first, second, and third single-stage PFC modules; and
wherein the controller uses the phase current reference signals to generate gate driving signals for one or more switches of the first, second, and third single-stage PFC modules;
wherein simultaneous PFC operation and output voltage regulation with soft-switching is provided by the first, second, and third single-stage PFC modules.

18. The method of claim 12, wherein each of the first, second, and third single-stage PFC modules comprises an isolated PWM boost converter.

19. The method of claim 18, wherein the single control parameter is duty cycle and is used by the controller to adjust a duty cycle of the first, second, and third single-stage PFC modules;
wherein the controller generates gate driving signals for one or more switches of the first, second, and third single-stage PFC modules;
wherein simultaneous PFC operation and output voltage regulation with soft-switching is provided by the first, second, and third single-stage PFC modules.

20. The method of claim 12, further comprising using the three-phase AC-DC converter to charge an electric vehicle.

* * * * *